United States Patent
Ishida (10) Patent No.: US 8,165,225 B2
(45) Date of Patent: Apr. 24, 2012

(54) IMAGE DATA TRANSFER CIRCUIT

(75) Inventor: Keitaro Ishida, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 1477 days.

(21) Appl. No.: 11/703,668

(22) Filed: Feb. 8, 2007

(65) Prior Publication Data

US 2007/0279496 A1    Dec. 6, 2007

(30) Foreign Application Priority Data

May 30, 2006    (JP) ................................ 2006-149334

(51) Int. Cl.
*H04N 7/64* (2006.01)
(52) U.S. Cl. .................................................. 375/240.27
(58) Field of Classification Search ............. 375/240.01, 375/240.27, 240.25
See application file for complete search history.

(56) References Cited

U.S. PATENT DOCUMENTS

| | | | | |
|---|---|---|---|---|
| 5,951,646 | A  * | 9/1999  | Brandon ....................... | 709/231 |
| 6,754,439 | B1 * | 6/2004  | Hensley et al. ............... | 386/341 |
| 2004/0179825 | A1 * | 9/2004  | Im ................................. | 386/111 |
| 2004/0223551 | A1 * | 11/2004 | Hannuksela ............. | 375/240.25 |
| 2009/0249393 | A1 * | 10/2009 | Shelton et al. .................. | 725/39 |

FOREIGN PATENT DOCUMENTS

| | | |
|---|---|---|
| JP | 09-139828 | 5/1997 |
| JP | 11-202848 | 7/1999 |

* cited by examiner

*Primary Examiner* — Eleni Shiferaw
*Assistant Examiner* — Tamara Teslovich
(74) *Attorney, Agent, or Firm* — Studebaker & Brackett PC; Donald R. Studebaker (57) ABSTRACT

An image data transfer circuit and an image data transfer method capable of exception processing without affecting image data of normal frames when an error is detected in image data. Image data applied to an input processing section is filtered by a filter, stored in an FIFO buffer, and sequentially read from an output section for transfer to the outside. In this event, two frame counters count numbers of frames which are being processed in input processing and output processing, respectively. When an error is detected in the input processing section, a stop controller does not output a stop request signal if the two count values do not match, and outputs the stop request signal at the time the two count values match. In this way, operations on error data are stopped after all image data of normal frames stored in the FIFO buffer has been transferred to the outside.

10 Claims, 5 Drawing Sheets

FIG. 5

IMAGE DATA TRANSFER CIRCUIT

BACKGROUND OF THE INVENTION

1. Field of the Invention

The present invention relates to an image data transfer circuit and an image data transfer method for capturing image data sent from a video camera or the like into an LSI (Large Scaled Integrated Circuit), and more particularly, to exception control when an error occurs.

2. Description of the Related Art

Figure 1:
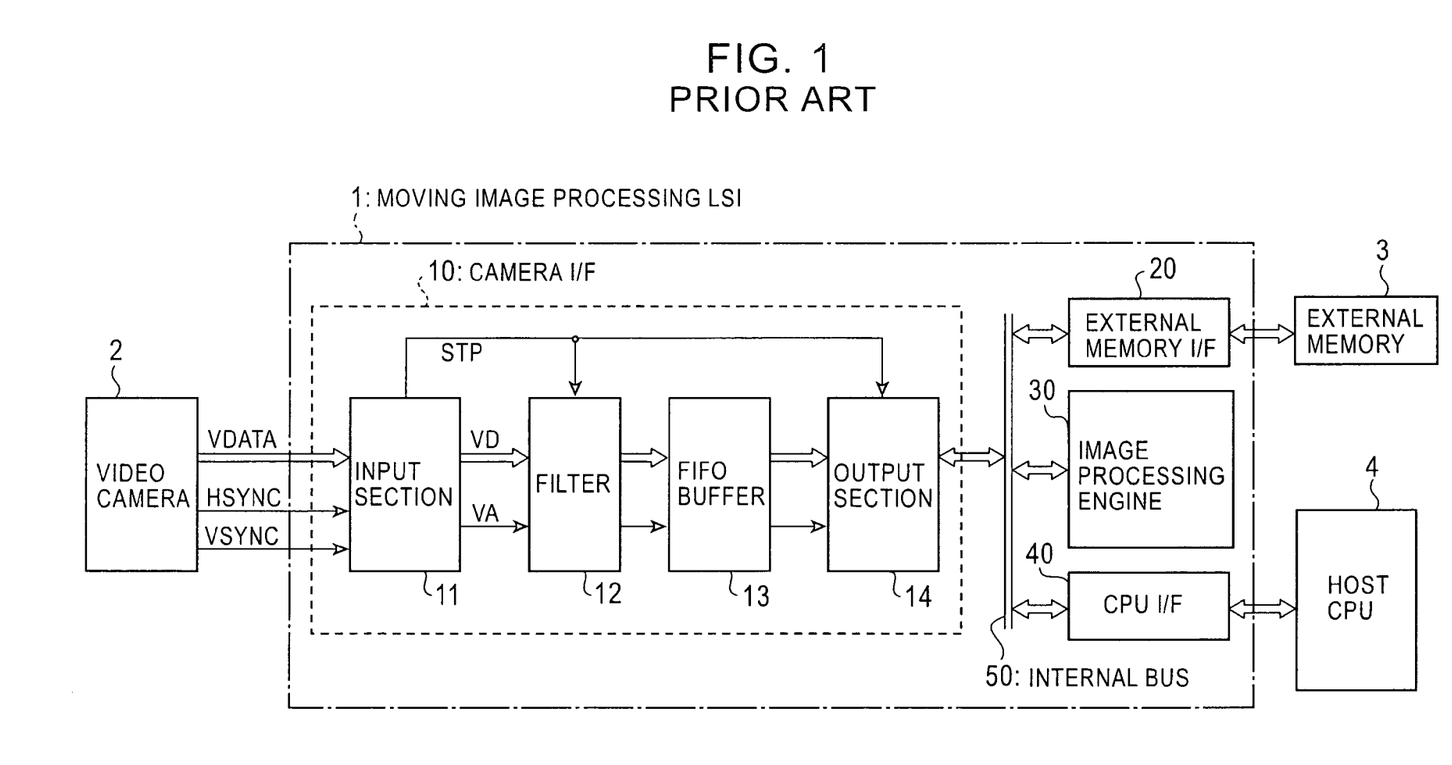
FIG. 1 is a configuration diagram of a conventional moving image processing LSI.

FIG. 1 is a configuration diagram of a conventional moving image processing LSI.

This moving image processing LSI 1 performs image processing on image data sent thereto from a video camera 2, stores the processed image data in an external memory 3, and notifies an external host CPU (Central Processing Unit) 4 of the completion of the image processing, thereby enabling the host CPU 4 to read the image data after the image processing. This moving image processing LSI 1 comprises a camera interface (hereinafter, the interface is called the "I/F") 10, an external memory I/F 20, image processing engine 30, and CPU I/F 40, all of which are interconnected through a common internal bus 50.

The camera I/F 10 transfers image data VDATA sent from the video camera 2 together with a vertical synchronizing signal VSYNC and a horizontal synchronizing signal HSYNC to the memory I/F 20 through the internal bus 50. The external memory I/F 20 writes the image data transferred from the camera I/F 10 into the external memory 3, as well as writes the image data into the external memory 3 in response to a request from the image processing engine 30, and reads the image data from the external memory 3 in response to a request from CPU I/F 40. The image processing engine 30 applies encoding processing and the like to the image data written into the external memory 3 by the camera I/F 10, and again stores the resulting image data in the external memory 3. The CPU I/F 40 reads the encoded image data from the external memory 3 and transfers the read image data to the host CPU 4.

The camera I/F 10 in the moving image processing LSI 1 comprises an input section 11, a filter 12, a FIFO (First-In First-Out) buffer 13, and an output section 14. The input section 11 inputs the image data VDATA sent from the video camera together with the vertical synchronizing signal VSYNC and horizontal synchronizing signal HSYNC, and outputs the image data signal VD together with an image data validity signal VA indicative of whether or not the image data signal VD is valid in units of pixels to the filter 12. Further, the input section 11 has an error detection function for detecting errors in the image data VDATA, and outputs a stop request signal STP to the filter 12 and output section 14 when an error is detected.

The input section 11, filter 12, FIFO buffer 13, and output section 14 are interconnected through pipe lines comprised of the image data signal VD and image data validity signal VA, such that the image data is written into the memory I/F 20 from the output section 14 through the internal bus 50.

In this camera I/F 10, the image data VDATA of the video camera 2 is input by the vertical synchronizing signal VSYNC and horizontal synchronizing signal HSYNC. The input section 11 captures the image data VDATA as valid data during a period in which the two synchronizing signals VSYNC, HSYNC are output. The input image data VDATA propagates the filter 12 and FIFO buffer 13 in order as the image data signal VD through pipeline processing together with the image data validity signal, and eventually is output from the output section 14 to the internal bus 50.

The filter 12, FIFO buffer 13, and output section 14 determine that new image data is input when the image data validity signal VA is output, and process the image data signal VD. The pipeline processing is performed in synchronism with the image data validity signal VA which is applied in units of pixels.

Upon detection of an error in the input image data VDATA, the input section 11 outputs the stop request signal STP to the filter 12 and output section 14 in order to stop the processing for capturing a frame including the image data. In this way, the pipeline processing under execution is stopped to stop processing the frame including the erroneous image data, alleviating a use load on the internal bus 50. Prior art documents related to image data transfer include the followings:

Japanese Patent Kokai No. 9-139828 (Patent Document 1); and

Japanese Patent Kokai No. 11-202848 (Patent Document 2).

However, the aforementioned camera I/F 10 has the following problems.

Specifically, as the stop request signal STP is output due to an error in input image data VDATA, the pipeline processing is stopped in the input section 11, filter 12, and output section 14. However, the transfer of image signal to the internal bus 50 in the output section can delay depending on a loading state on the internal bus 50. Therefore, when the stop request signal STP is output, image data of the previous normal frame may not have been transferred in some cases. In such a case, the data transfer is stopped by the stop request signal STP, leading to a problem that even the image data of the normal frame is broken.

SUMMARY OF THE INVENTION

It is an object of the present invention to provide an image data transfer circuit which is capable of performing exception processing without affecting image data of normal frames when an error is detected in image data.

An image data transfer circuit according to one aspect of the present invention is characterized by comprising an input processing section for determining whether image data applied in accordance with a frame synchronizing signal is valid or invalid, outputting valid image data as an image data signal in units of pixels, outputting an error detection signal when invalid image data is detected, and stopping outputting subsequent image data signals of the frame, a buffer for storing the image data signal output from the input processing section, and reading the stored image data signal in response to a read request in an order in which the image data signal was stored, an output section for reading the image data signal from the buffer and transferring the image data signal to the outside, a first counter for counting a frame number of image data which is being processed in the input processing section, a second counter for counting a frame number of image data which is being processed in the output section, and a stop controller for allowing the output section to continue the processing if count values of the first and second counters do not match when the error detection signal is output, and stopping the processing of the output section when the count values match.

According to the foregoing aspect of the present invention, the data transfer circuit comprises the stop controller for continuously transferring image data to the outside if the frame number of image data being processed in the input processing section does not match the frame number of image data being processed in the output section, and stopping transferring the image data to the outside at the time the frame numbers match, upon occurrence of an error in input image data. In this way, effectively, even if error occurs in image data, normal image data so far input is not prevented from being transferred to the outside.

An image data transfer circuit according to another aspect of the present invention comprises an input processing section for determining whether image data applied in accordance with a frame synchronizing signal is valid or invalid, adding a start bit indicative of whether or not the image data is pixel data at the beginning of a frame to valid image data to output the resulting image data as an image data signal, and stopping outputting subsequent image data signals of the frame when invalid image data is detected, a buffer for storing the image data signal, including the start bit, output from the input processing section, and reading the stored image data signal in response to a read request in an order in which the image data signal was stored, and an output section for reading the image data signal from the buffer and transferring the image data signal to the outside as image data of a new frame when the start bit in the read image data signal indicates that the image data is the pixel data at the beginning.

An image data transfer method according to another aspect of the present invention comprises an input processing step for determining whether image data applied in accordance with a frame synchronizing signal is valid or invalid, outputting valid image data as an image data signal in units of pixels, outputting an error detection signal when invalid image data is detected, and stopping outputting subsequent image data signals of the frame, a storing/reading step for storing the image data signal output in the input processing step, and reading the stored image data signal in response to a read request in an order in which the image data signal was stored, an outputting step for transferring the image data signal read in said storing/reading step to the outside, a first counting step for counting a frame number of image data which is being processed in the input processing step, a second counting step for counting a frame number of image data which is being processed in the outputting step, and a stop controlling step for allowing said outputting step to continue the processing if count values of said first and second counters do not match when the error detection signal is output, and stopping the processing in said outputting step when the count values match.

An image data transfer method according to a yet another aspect of the present invention comprises an input processing step for determining whether image data applied in accordance with a frame synchronizing signal is valid or invalid, adding a start bit indicative of whether or not the image data is pixel data at the beginning of a frame to valid image data to output the resulting image data as an image data signal, and stopping outputting subsequent image data signals of the frame when invalid image data is detected, a storing/reading step for storing the image data signal, including the start bit, output in the input processing step, and reading the stored image data signal in response to a read request in an order in which the image data signal was stored, and an outputting step for transferring the image data signal read in the storing/reading step to the outside as image data of a new frame when the start bit in the read image data signal indicates that the image data is the pixel data at the beginning.

The above and other objects and novel features of the present invention will become more fully apparent from the following description of preferred embodiment when read in connection with the accompanying drawings. However, the drawings are provided for purposes of description by all means, and do not limit the scope of the invention.

DESCRIPTION OF THE PREFERRED EMBODIMENTS

First Embodiment

Figure 2:
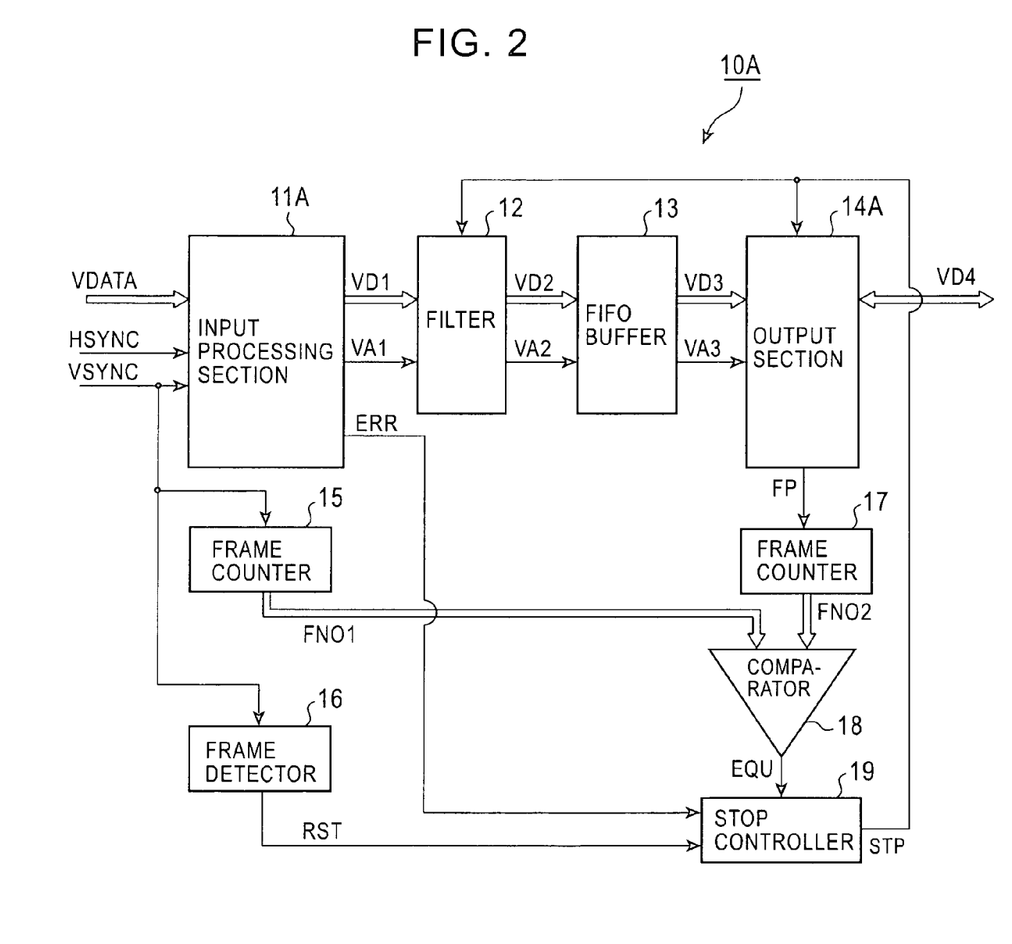
FIG. 2 is a configuration diagram of an image data transfer circuit showing a first embodiment of the present invention.

FIG. 2 is a configuration diagram of an image data transfer circuit showing a first embodiment of the present invention.

This image data transfer circuit 10A is provided, for example, in place of the camera I/F 10 in FIG. 1, and comprises an input-side frame counter 15, a frame detector 16, an output-side frame counter 17, a comparator 18, and a stop controller 19, in addition to an input processing section 11A, a filter 12, a FIFO buffer 13, and an output section 14A.

The input processing section 11 inputs image data VDATA sent thereto from a video camera or the like in synchronism with frame synchronizing signals, i.e., a vertical synchronizing signal VSYNC and a horizontal synchronizing signal HSYNC, and output an image data signal VD1 in units of pixels to the filter 12 together with an image data validity signal VA1 indicative of whether or not the image data signal VD1 is valid. For example, the image data validity signal VA1 indicative of valid image data is generated, for example, when the two synchronizing signals VSYNC (vertical synchronizing signal) and HSYNC (horizontal synchronizing signal) are both normally input, and is added to the image data signal VD1 in units of pixels. The image data validity signal VA1 indicative of an error is generated when at least one of VSYNC and HSYNC is not normally input, and is added to the image data signal VD1 in units of pixels. In this connection, "whether the synchronizing signals are normally input" is determined by the presence or absence of the normal synchronizing signals in times which should exist at regular intervals. Further, upon detection of an error in the image data VDATA, the input processing section 11A outputs an error detection signal ERR to the stop controller 19, and stops the subsequent input processing on the image data signal VD1 for the frame.

The filter 12 performs filtering processing, such as noise reduction, contour correction and the like on the image data signal VD1 applied thereto from the input processing section 11A as required, and applies the FIFO buffer 13 with an image data signal VD2 resulting from the processing, and the image data validity signal VA2. The FIFO buffer 13 sequentially stores the image data signal VD2 applied from the filter 12, and reads the image data signal VD2 in the order in which they ere stored, in response to a read request from the output section 14A as an image data signal VD3.

The output section 14A receives the image data validity signal VA3, reads image data stored in the FIFO buffer 13, and outputs an image data signal VD4 to the internal bus. The output section 14A further outputs a frame start pulse FP to the frame counter 17 each time a frame of read image data starts, and stops the operation when the stop request signal STP is given.

The input processing section 11A, filter 12, FIFO buffer 13, and output section 14A are interconnected through pipe lines comprised of the image data signal VD and image data validity signal VA. Then, when the image data validity signal VA, applied in units of pixels<indicates a valid state (for example, level "H"), it is determined that new image data has been input, and pipeline processing is performed on the image data signal VD in synchronism with the image data validity signal VA.

On the other hand, the frame counter 15 disposed on the input side counts up each time the vertical synchronizing signal VSYNC rises to output a number FNO1 of a frame which is currently being input. This frame number FNO1 is applied to one input terminal of the comparator 18. The frame detector 16 also applies the stop controller 19 with a re-start signal RST each time the vertical synchronizing signal VSYNC rises.

The frame counter 17 disposed on the output side, in turn, counts the frame start pulse FP applied from the output section 14A to output a frame number FON2 of a frame which is currently being output. This frame number FNO2 is applied to the other input terminal of the comparator 18. The comparator 18 compare the two frame numbers FNO1, FNO2, and applies a matching signal EQU to the stop controller 19 when the frame numbers match.

The stop controller 19 determines whether or not the matching signal EQU is output from the comparator 18 when the error detection signal ERR from the input processing section 11A is applied thereto, and does not output the stop request signal STP while the matching signal EQU is not output, while outputs the stop request signal STP when the matching signal EQU is output. The stop controller 19 stops outputting the stop request signal STP when the re-start signal RST from the frame detector 16 is applied thereto.

Figure 3:
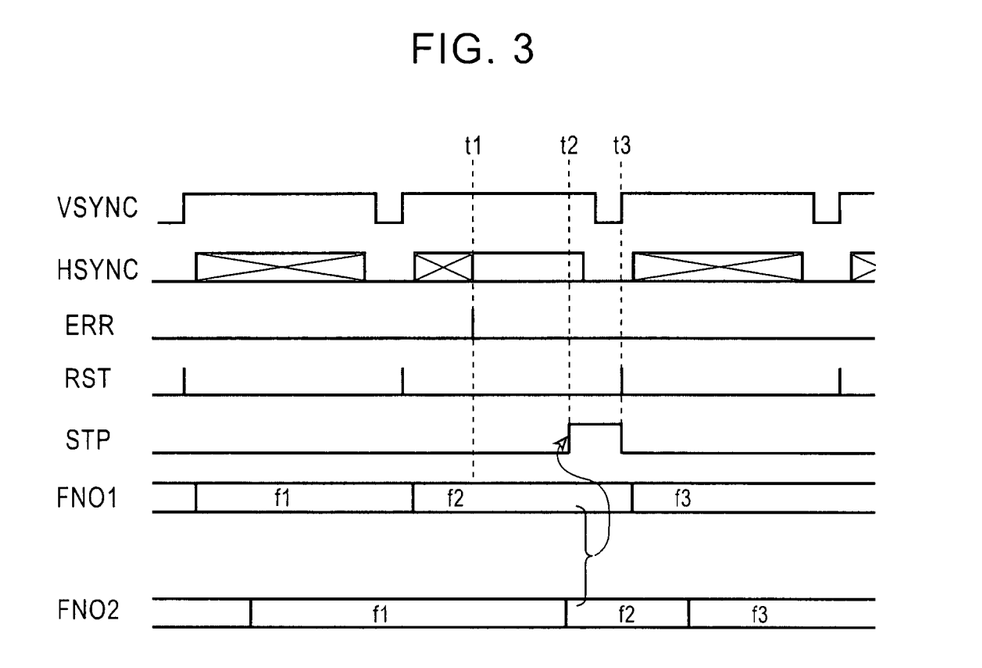
FIG. 3 is a signal waveform chart showing the operation of the image data transfer circuit of FIG. 2.

FIG. 3 is a signal waveform chart showing the operation of the image data transfer circuit of FIG. 1. In the following, the operation of FIG. 1 will be described with reference to FIG. 3.

As the image data VDATA, vertical synchronizing signal VSYNC, and horizontal synchronizing signal HSYNC are supplied to the image data transfer circuit 10A from a signal source such as a video camera, the input processing section 11A captures the image data VDATA as valid data during a period in which the two synchronizing signals VSYNC, HSYNC are both output normally from the signal source.

The input processing section 11A determines whether or to the input image data VDATA is erroneous, and outputs the input image data VDATA as an image data signal VD1 to the filter 12 together with the image data validity signal VA1, for example, at H level when the image data VDATA is normal. In this event, the error detection signal ERR is not output. The image data propagates the FIFO buffer 13 and output section 14A in this order through pipeline processing, and is eventually output to the internal bus from the output section 14A.

In the filter 12, FIFO buffer 13, and output section 14, it is determined that new image data has been input when the image data valid data VA1, VA2, VA3 indicate valid states (for example, level "H"), respectively. The pipeline processing is performed in synchronism with the image data validity signal VA applied on a pixel-by-pixel basis. In this event, the frame number FNO2 output from the output-side frame counter 17 matches the frame number FNO1 output from the input-side frame counter 16 or indicates a slightly smaller value. Also, since the error detection signal ERR is not output, the stop controller 19 does not either output the stop request signal STP.

At time t1 in FIG. 3, upon detection of an error in image data while the input processing section 11A is receiving image data VDATA of a frame number f2, the input processing section 11A outputs an error detection signal ERR to the stop controller 19. At this timing, if the output section 14A is reading an image data signal VD3 of a frame number f1 from the FIFO buffer 13, the value of the frame number FNO2 output from the frame counter 17 is f1. Therefore, the comparator 18 does not output the matching signal EQU. Consequently, the stop controller 19 does not either output the stop request signal STP, so that the filter 12, FIFO buffer 13, and output section 14A continue to operate.

At time t2, as the output section 14A has fully read and transferred the image data signal VD3 of the frame number f1 from the FIFO buffer 13 to the internal bus, and starts processing the image data signal VD3 of the frame number f2, the output section 14A outputs a frame pulse FP. This frame pulse FP causes the frame counter 17 to count up, resulting in the value of the frame number FNO2 equal to f2. In this way, the comparator 18 outputs the matching signal EQU, and the stop controller 19 also outputs the stop request signal STP. Since the stop request signal STP is applied to the filter 12 and output section 14A, the operation of the entire image data transfer circuit 10A is stopped.

At time t3, as the vertical synchronizing signal VSYNC of the next frame rises, the frame counter 15 counts up to cause the frame number FNO1 to be equal to f3, and the frame detector 16 outputs the re-start signal RST. The re-start signal RST resets the stop controller 19, so that the stop controller 19 stops outputting the stop request signal STP. In this way, the operation of the entire image data transfer circuit 10A is resumed.

In this connection, when an error is detected in image data at time t1, if the input processing section 11A is receiving image data VDATA of the frame number f1, and the output section 14A is outputting the frame f1, the frame counters 15 and 17 have the frame numbers FNO1 and FNO2 both equal to f1. Accordingly, the comparator 18 outputs the matching signal EQU, causing the stop controller 19 to immediately output the stop request signal STP. In this way, the operation of the entire image data transfer circuit 10A is immediately stopped.

In the foregoing manner, the image data transfer circuit of the first embodiment comprises the frame counter 15 for counting the number FNO1 of a frame which is currently being input, and the frame counter 17 for counting the number FNO2 of a frame which is currently being output, and comprises the stop controller 19 for continuing the output processing if the two frame numbers FNO1, FNO2 are different when an error is detected during the input processing, and stopping the entire processing at the timing at which these frame numbers FNO1, FNO2 match. Advantageously, the transfer of only image data of a frame in which the error is found can be stopped without breaking image data of normal frames. Further advantageously, the image data transfer circuit is re-started by the start of the next frame after the error occurred, so that the image data of the next frame can be normally processed.

Second Embodiment

Figure 4:
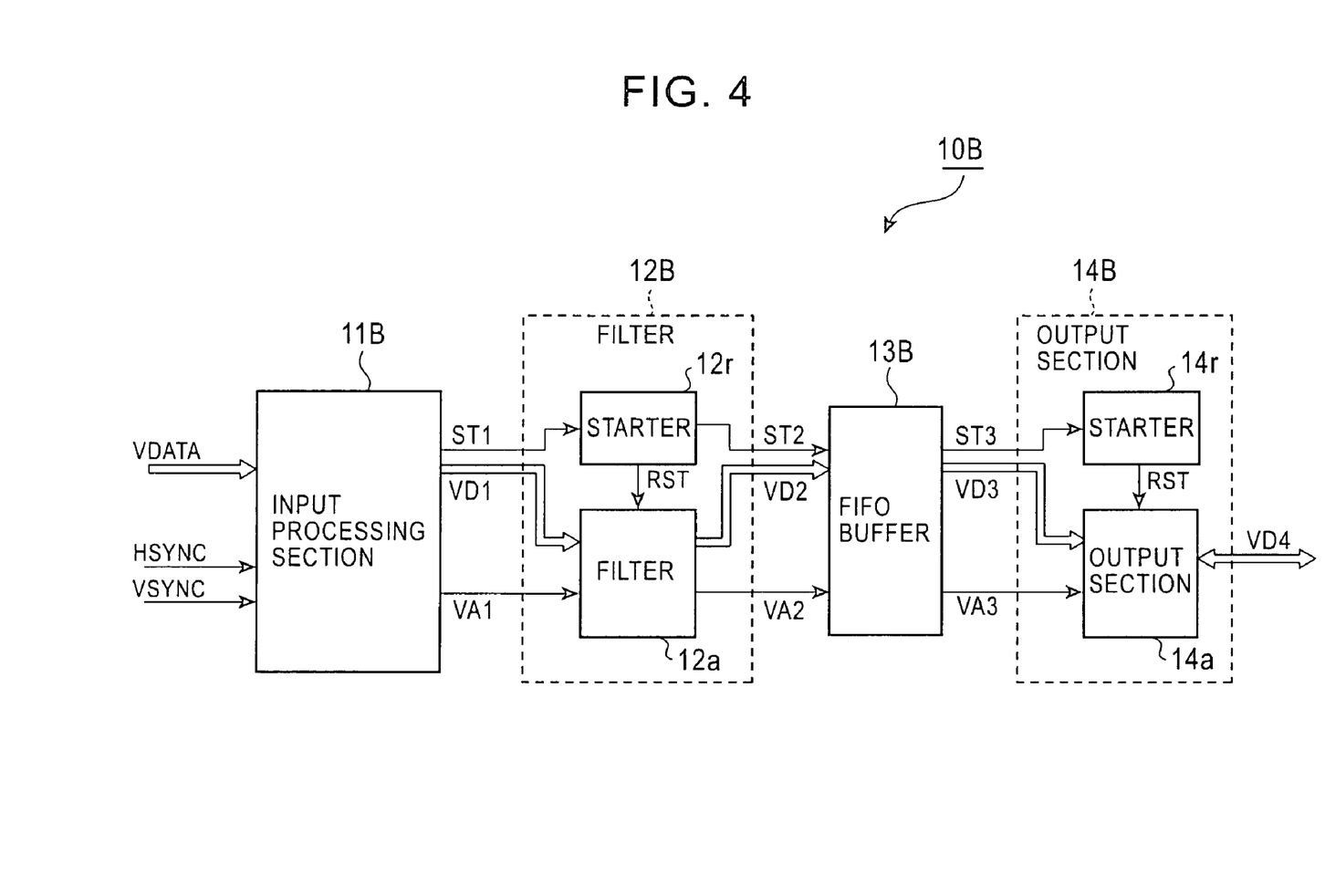
FIG. 4 is a configuration diagram of an image data transfer circuit showing a second embodiment of the present invention.

FIG. 4 is a configuration diagram of an image data transfer circuit showing a second embodiment of the present invention, where elements common to the elements in FIG. 1 are designated by the same reference numerals.

This image data transfer circuit 10B comprises an input processing section 11B, a filter 12B, a FIFO buffer 13B, an output section 14B, and a frame detector 16.

The input processing section 11B is configured to add a start bit ST1 to a 24-bit image data signal VD1, which is image data, for example, for one pixel, for indicating whether or not the image data is the first pixel in a frame, and apply the resulting signal to the filter 12B.

The input processing section 11B also outputs an image data validity signal VA1 which indicates whether or not the image data signal VD1 is normal, and also indicates the timing of the image data signal VD1, in addition to the image data signal VD1 and start bit ST1.

The filter 12B comprises a starter 12r added to a filter 12a which has a reset function. Specifically, the filter 12a performs predetermined filtering processing in accordance with the image data signal VD1 and image data validity signal VA1, and outputs the filtered image data signal VD2 in synchronism with the image data validity signal VA2. Also, the filter 12a has a function of returning to an initial state when the re-start signal RST is applied thereto. On the other hand, the starter 12r applies the start bit ST1 as the re-start signal RST to the filter 12a, and outputs the start bit ST1 as the start bit ST2 to the FIFO buffer 13B in conformity to the timing of the image data signal VD2 output from filter 12.

The FIFO buffer 13B sequentially stores the image data signal VD2 and start bit ST2 in conformity to the image validity signal VA2, and reads them as an image data signal VD3 and a start it ST3 in response to a read request from the output section 14B in the order in which they were stored.

The output section 16B comprises a starter 14r added to an output section 12a which has a reset function. Specifically, the output section 12a reads the video data signal VD3 from the FIFO buffer 13B, and outputs an image data signal VD4 to the internal bus. Also, the output section 14a has a function of returning to an initial state when the re-start signal RST is applied thereto. On the other hand, the starter 14r applies the start bit ST3 read together with the image data signal VD3 from the FIFO buffer 13B as the re-start signal RST to the output section 14a.

Figure 5:
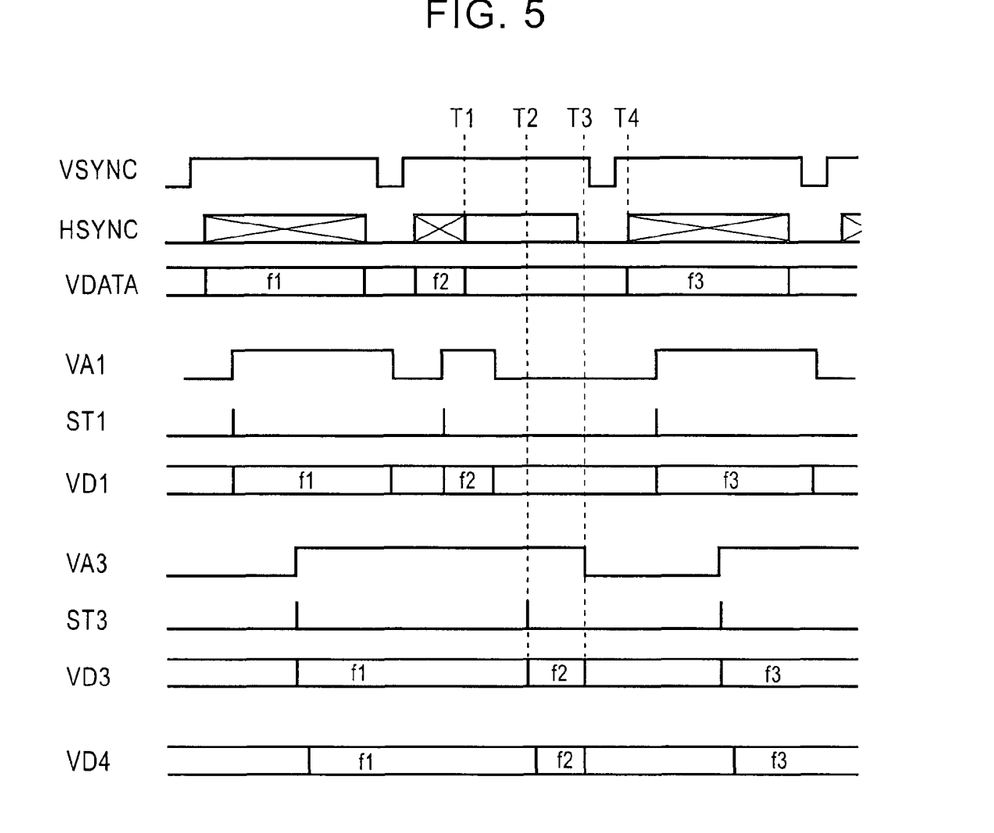
FIG. 5 is a signal waveform chart showing the operation of the image data transfer circuit of FIG. 4.

FIG. 5 is a signal waveform diagram showing the operation of FIG. 4.

In the input processing section 11B, as image data VDATA of a frame f1 is applied after the vertical synchronizing signal VSYNC from a video camera or the like has risen, and the horizontal synchronizing signal HSYNC has also risen, "1" is set to the start bit ST1 together with the image data signal VD1 of the first pixel in the frame f1, and the image data validity signal VA1 is further output. Also, the video signal VD1 of the second pixel onward is output together with the image data validity signal VA1, with the start bit ST1 being set to "0."

In the filter 12B, the re-start signal RST is applied to the filter 12a from the starter 12r when the start bit ST1 is "1." After the filter 12a is set to an initial state, the filter 12a filters the image data signal VD1 applied from the input processing section 11B together with the image data validity signal VA1, and outputs the processed image data as an image data signal VD2. The starter 12r in turn outputs the start bit ST2 to the FIFO buffer 13B in conformity to the timing of the image data signal VD2 output from the filter 12a.

The FIFO buffer 13B sequentially stores the image data signal VD2 and start bit ST2 in conformity to the timing of the image data validity signal VA2. The image data VD2 and start bit ST2 stored in the FIFO buffer 13B are sequentially read in response to a read request from the output section 14B as an image data signal VD3 and start bit ST3. The image data signal VD3 is applied to the output section 14a, while the start bit ST3 is applied to the starter 14r. The starter 14r outputs the re-start signal RST to the output section 14a when the start bit ST3 is at "1." In this way, the output section 14a is set to the initial state when the first pixel of the frame f1 is present, and the image data signal VD3 applied from the FIFO buffer 13B is output to the internal bus as an image data signal VD4.

Assume herein that an error occurs in image data VDATA of a frame f2 input to the input processing section 11B at time T1 in FIG. 5 when the output section 14B is reading the image data signal VD3 of the frame 1 from the FIFO buffer 13B and outputting it to the internal buffer as an image data signal VD4. Upon detection of the error in the image data VDATA, the input processing section 11B stops the operation of the input processing at that timing, and stops inputting subsequent image data VDATA of the frame f2 and outputting it to the filter 12B. In this way, the image data validity signal VA1 subsequently remains in an invalid state (level "0"). In this way, subsequent image data signals are not supplied to the filter 12B and FIFO buffer 13B, and these processes stop operating in order.

On the other hand, the output section 14B continues to read the image data of the frame f1 stored in the FIFO buffer 13B and transfer it to the internal bus. Then, when the output section 14B has read the image data of the frame f1 and transferred it to the internal buffer, the output section 14B starts reading image data of the next frame f2 and transferring it to the internal buffer.

However, as the FIFO buffer 14B is exhausted at time T3, the output section 14B also stops the reading operation.

At time T4, as image data VDATA of the next frame f3 is input, the input processing section 11B detects the beginning of the frame f3 to resume the operation for capturing the image data VDATA. Then, the input processing section 11B sets the start bit ST1 indicative of the beginning of the frame f3 to "1" to output the image data signal VD1, and also outputs the image data validity signal VA1 indicating that the image data signal VD1 is valid. In the filter 12B at the later stage, upon detection of the image data signal VD1 which has the start bit ST1 set to "1," the starter 12r initializes the filter 12a, followed by the resumption of the processing for the next frame f3. The image data signal VD2 of the frame f3 output from the filter 12a is stored in the FIFO buffer 13B together with the start bit ST2. Further, the image data of the frame f3 stored in the FIFO buffer 13B is read by the output section 14B. Then, upon detection of the image data signal VD3 which has the start bit ST3 set to "1," the starter 14r initializes the output section 14a, followed by the resumption of the processing for the next frame f3.

As described above, the image data transfer circuit of the second embodiment is configured such that upon detection of the beginning of a frame, the input processing section 11B adds the start bit ST1 to the image data signal VD1 for indicating the beginning of the frame and outputs the resulting frame to a later stage, and the filter 12B and FIFO buffer 13B transfer the start bit ST to respective later stages. In this way, the output section 14B can be re-started and transfer data to the internal bus at the time it detects the start bit ST3, so that all normal frames stored in the FIFO buffer 13B can be advantageously transferred to the internal bus without discarding them. Also, since the filter 12B and output section 14B are re-started in response to the start bit ST applied on a frame-by-frame basis to process image data, error data in the previous frame is advantageously prevented from affecting the processing on the next frame. Further, in the second embodiment, the overall circuit configuration can be advantageously simplified though the capacity of the FIFO buffer 13B is increased by the start bits as compared with the first embodiment.

It should be understood that the present invention is not limited to the foregoing embodiments, but a variety of modifications can be made thereto. Such exemplary modifications may include the followings, by way of example.

(a) The filters 12, 12B need not be provided when the input image data VDATA need not be filtered.

(b) While the vertical synchronizing signal VSYNC and horizontal synchronizing signal HSYNC are used as timings for the image data VDATA, the frame synchronizing signal indicative of a frame start timing is only required.

This application is based on Japanese Patent Application No. 2006-149334 which is hereby incorporated by reference.

What is claimed is:

1. An image data transfer circuit comprising:
   an input processing section to determine whether image data applied in accordance with a frame synchronizing signal is valid or invalid, wherein the input processing section is configured to output valid image data as an image data signal in units of pixels, to output an error detection signal when invalid image data is detected, and to stop outputting subsequent image data signals of the frame;
   a buffer to store the image data signal output from said input processing section, and to read the stored image data signal in response to a read request in an order in which the image data signal was stored;
   an output section to read the image data signal from said buffer and to transfer the image data signal to a data bus;
   a first counter to count a frame number of image data which is being processed in said input processing section;
   a second counter to count a frame number of image data which is being processed in said output section; and
   a stop controller to allow said output section to continue the processing if count values of said first and second counters do not match when the error detection signal is output, and to stop the processing of said output section when the count values match,
   wherein said frame synchronizing signal includes a horizontal synchronizing signal and a vertical synchronizing signal, said input processing section is configured to generate an image data validity signal indicative of valid image data and to add the image data validity signal to the image data signal when the horizontal synchronizing signal and the vertical synchronizing signal are normally input to the frame synchronizing signal, and to generate the image data validity signal indicative of an error and to add the image data validity signal to the image data as the error detection signal when at least one of the horizontal synchronizing signal and vertical synchronizing signal is not normally input.

2. An image data transfer circuit according to claim 1, wherein the image data signal output from said input processing section is output to a filter circuit, and an output data signal of said filter circuit is input to said buffer.

3. An image data transfer circuit comprising:
   an input processing section to determine whether image data applied in accordance with a frame synchronizing signal is valid or invalid, wherein the input processing section is configured to add a start bit indicative of whether or not the image data is pixel data at the beginning of a frame to valid image data to output the resulting image data as an image data signal, and to stop outputting subsequent image data signals of the frame when invalid image data is detected;
   a buffer to store the image data signal, including the start bit, output from said input processing section, and to read the stored image data signal in response to a read request in an order in which the image data signal was stored; and
   an output section to read the image data signal from said buffer and to transfer the image data signal to a data bus as image data of a new frame when the start bit in the read image data signal indicates that the image data is the pixel data at the beginning,
   wherein said frame synchronizing signal includes a horizontal synchronizing signal and a vertical synchronizing signal, said input processing section is configured to generate an image data validity signal indicative of valid image data and to add the image data validity signal to the image data signal when the horizontal synchronizing signal and the vertical synchronizing signal are normally input to the frame synchronizing signal, and to generate the image data validity signal indicative of an error and to add the image data validity signal to the image data as the error detection signal when at least one of the horizontal synchronizing signal and vertical synchronizing signal is not normally input.

4. An image data transfer circuit according to claim 3, wherein the image data signal output from said input processing section is output to a filter circuit, and an output data signal of said filter circuit is input to said buffer.

5. An image data transfer circuit according to claim 4, wherein said filter circuit is initialized by the start bit.

6. An image data transfer method comprising:
   an input processing step for determining whether image data applied in accordance with a frame synchronizing signal is valid or invalid, outputting valid image data as an image data signal in units of pixels, outputting an error detection signal when invalid image data is detected, and stopping outputting subsequent image data signals of the frame;
   a storing/reading step for storing the image data signal output in said input processing step, and reading the stored image data signal in response to a read request in an order in which the image data signal was stored;
   an outputting step for transferring the image data signal read at said writing/reading step to a data bus;
   a first counting step for counting a frame number of image data which is being processed in said input processing step;
   a second counting step for counting a frame number of image data which is being processed in said outputting step; and
   a stop controlling step for allowing said outputting step to continue the processing if count values of said first and second counters do not match when the error detection signal is output, and stopping the processing in said outputting step when the count values match,
   wherein said frame synchronizing signal includes a horizontal synchronizing signal and a vertical synchronizing signal, said input processing step generates an image data validity signal indicative of valid image data and adds the image data validity signal to the image data signal when the horizontal synchronizing signal and the vertical synchronizing signal are normally input to the frame synchronizing signal, and generates the image data validity signal indicative of an error and adds the image data validity signal to the image data as the error detection signal when at least one of the horizontal synchronizing signal and vertical synchronizing signal is not normally input.

7. An image data transfer method comprising:

an input processing step for determining whether image data applied in accordance with a frame synchronizing signal is valid or invalid, adding a start bit indicative of whether or not the image data is pixel data at the beginning of a frame to valid image data to output the resulting image data as an image data signal, and stopping outputting subsequent image data signals of the frame when invalid image data is detected;

a storing/reading step for storing the image data signal, including the start bit, output in said input processing step, and reading the stored image data signal in response to a read request in an order in which the image data signal was stored; and an outputting step for transferring said image data signal read in said storing/reading step to a data bus as image data of a new frame when the start bit in the read image data signal indicates that the image data is the pixel data at the beginning, wherein said frame synchronizing signal includes a horizontal synchronizing signal and a vertical synchronizing signal, said input processing step generates an image data validity signal indicative of valid image data and adds the image data validity signal to the image data signal when the horizontal synchronizing signal and the vertical synchronizing signal are normally input to the frame synchronizing signal, and generates the image data validity signal indicative of an error and adds the image data validity signal to the image data as the error detection signal when at least one of the horizontal synchronizing signal and vertical synchronizing signal is not normally input.

8. An image data transfer circuit according to claim 3, wherein the image data signal output in said input processing section is configured to be processed in a filter, an output data signal of said filter is stored in said buffer.

9. An image data transfer circuit according to claim 8, wherein said filter is initialized by the start bit.

10. An image data transfer method according to claim 7, wherein the image data signal output in said input processing step is processed in a filtering step, an output data signal of said filtering step is stored in said storing/reading step.

* * * * *